United States Patent Office 2,918,483
Patented Dec. 22, 1959

2,918,483
METHOD FOR PRODUCTION OF WERNER TYPE CHROMIC COMPOUNDS CONTAINING INORGANIC AND ORGANIC RADICALS

Ago Varul, Goteborg, Sweden, assignor to Svenska Oljeslageri Aktiebolaget, Goteborg, Sweden, a Swedish corporation No Drawing. Application June 28, 1954
Serial No. 439,897

Claims priority, application Sweden June 29, 1953

6 Claims. (Cl. 260—438)

Werner type chromic compounds containing halogen or radicals of other monobasic mineral acids as well as of organic acids are useful for various impregnating purposes. Aqueous solutions of such compounds containing for instance radicals of the higher fatty acids or of resinic acids may be used for waterproofing paper, textiles and leather while the analogous compounds containing for instance acrylic, methacrylic, or maleic acid radicals are used in pretreating glass fiber materials intended for reinforcing articles made of unsaturated polyester resins.

Various methods have been suggested for preparing these compounds. The most successful method known is to reduce chromyl chloride with an alcohol in presence of the organic acid. The method has its drawbacks especially if the organic acid to be used is of such a nature that it is more readily oxidized than the alcohol so that a good deal of it will be destroyed during the reaction. Carbon tetrachloride must be used as a solvent for the chromyl chloride in order to avoid the danger of ignition. Chromic acid can be used instead of chromyl chloride but it is insoluble in carbon tetrachloride and the violent reaction of the crystalline chromic acid with organic substances makes its use too hazardous for industrial operation. It has also been suggested first to prepare a basic chromic salt e.g. by adding say one mol of alkali to a solution of one mol of a chromic salt and then to boil this solution with the organic acid until the reaction is complete. However, this reaction is quite slow especially with weak organic acids and the basic chromic salt rapidly becomes less and less reactive on standing and especially with boiling.

It has now been found that a much simpler method can be devised by allowing the basic chromic salt to be formed in a suitable organic solvent in presence of the organic acid by the action of an alkali or of a salt with alkaline reaction upon the corresponding "neutral" chromic salt. (As only chromic salts of strong monobasic mineral acids are considered these so called "neutral" salts exhibit a strongly acidic reaction when dissolved because they are hydrolyzed and the chromic hydroxide is a very weak base.)

The organic solvent used should be soluble in water and is preferably used in practically anhydrous condition. The reaction is not interfered with by minor quantities of water such as those contained in common ethanol or as they are present as water of crystallization of the chromic chloride. Larger concentrations of water, however, inhibit complex formation or destroy the complex formed by hydrolysis upon prolonged storage or when the solution is heated. Suitable solvents are for instance the lower alcohols containing from one to about four carbon atoms as well as the polyhydric alcohols, the lower ketones, dioxane, tetrahydrofurane etc.

In this way, for instance, a solution of chromic chloride and stearic or oleic acid in isopropyl alcohol may be treated with potassium hydroxide, sodium bicarbonate, sodium sulfite, or ammonia.

A particularly useful method of carrying this invention to practice is to use an alkali or alkaline earth salt of the very organic acid that is to be incorporated into the complex. Thus, a solution or suspension of chromic chloride in alcohol or in acetone may be reacted with a sodium or potassium soap of fatty acids or resinic acids, or with an alkali or earth alkali salt of methacrylic or maleic acid.

Another modification of the method according to this invention is to use a chromate or a bichromate of an alkali or alkaline earth metal as salt with basic reaction. This method is especially useful if the organic acid used is more stable to oxidation than the alcohol. The amount of basic chromic salt formed with this method is further increased by reduction of the chromic acid ion to chromic ion. This reduction is carried out by heating or boiling the mixture in an alcohol that is oxidized during the reaction. Preferably a secondary alcohol such as isopropyl alcohol is used for this purpose because it is oxidized to acetone which in itself is a suitable solvent. Primary alcohols are less suitable because the aldehydes formed by their oxidation tend to polymerize and make the product cloudy.

A still further modification of this invention, if using a chromate or dichromate, is to produce the chromic salt of the monobasic mineral acid "in situ" i.e. by adding to the mixture anhydrous hydrogen chloride either gaseous or dissolved in the alcohol. For instance, gaseous hydrogen chloride may be bubbled into a violently agitated mixture of finely pulverized sodium bichromate, stearic acid, and an excess of isopropyl alcohol.

As the temperature rises the bichromate is reduced to chromic salt and the desired complex salt is formed immediately if the introduction of hydrogen chloride is interrupted when 6 mols of hydrogen chloride have reacted per mol of bichromate ($Na_2Cr_2O_7$).

The complex chromic compounds made according to this invention may contain 1 or 2 chromium atoms per equivalent of organic acid according to the molecular proportions used for their preparation. In general, those containing 2 chromium atoms per organic acid equivalent are more stable.

Example 1

Mole proportion: chromium/stearic acid=2/1

To a solution of 5.6 parts of potassium hydroxide in 250 parts of ethanol, 29 parts of technical sodium stearate and 53.4 parts of technical chromic chloride were added. This mixture was boiled for 30 minutes so that a green, soluble complex chromic salt was formed. The solution of this salt was filtered and could be diluted with water in any proportion without any precipitate being formed. From a portion of the solution the ethanol was evaporated, vacuum being applied towards the end of the evaporation. The complex salt, which contained 2 atoms of chromium for each stearic acid radical, was obtained as a dark green paste. This paste was easily soluble in various alcohols and lower ketones as well as in water. These solutions as well as the original solution could be diluted with water. The diluted solutions were suitable for impregnating paper, textiles, leather, etc. After drying and heating to 115° C. the impregnated materials showed excellent hydrophobic properties. When leather was treated immediately after tanning while still being wet it absorbed the chromium complex from the solution at pH-values between 2.9 and 3.5 and it was not necessary to heat it after drying.

Example 2

(Mole proportion: chromium/methacrylic acid=2/1)

To a solution of 5.6 parts of potassium hydroxide in 120 parts of ethanol 12.4 parts of potassium methacrylate and 53.4 parts of chromic chloride were added. The mixture was boiled for 30 minutes. After filtration from the precipitate of potassium chloride formed the dark green solution contained a complex salt which was soluble in water and contained 2 atoms of chromium per molecule of methacrylic acid. The aqueous solution was used for impregnating glass fiber intended for reinforcing articles made of unsaturated polyester resins.

*Example 3*

(Mole proportion: chromium/stearic acid=1/1)

To a solution of 14.2 parts of stearic acid in 60 parts of ethanol 2.1 parts of magnesium carbonate and 13.5 parts of chromic chloride were added. This mixture was boiled for 10 minutes. The green homogeneous solution obtained remained clear when it was diluted with water. In general, this product had the same properties as the product described in Example 1. However, it was less stable even when stored as a concentrated alcoholic solution.

*Example 4*

(Mole proportion: chromium/maleic acid=2/1)

To a solution of 54 parts of chromic chloride in 200 parts of ethanol 19.2 parts of bi-potassium maleinate was added. This mixture was boiled for 10 minutes and the solution was filtered off the precipitate of potassium chloride formed. The properties of the filtrate were about the same as of that described in Example 2 and it could be used for the same purpose.

*Example 5*

(Mole proportion: chromium/phthalic acid=1/1)

To a solution of 27 parts of chromic chloride in 120 parts of ethanol 20.4 parts of mono-potassium phthalate was added. The mixture was boiled with violent agitation for about 30 minutes. The solution was cooled down to room temperature and filtered off the precipitate which consisted of potassium chloride. The filtrate remained clear when it was diluted with water. The aqueous solution could be used for impregnating solid materials such as fibers, fillers or surfaces of various articles in order to enhance the adhesion between these materials and lacquers or artificial resins.

*Example 6*

(Mole proportion: chromium/stearic acid=1/1)

An amount of 20 parts chromium nitrate and 15 parts of sodium stearate were introduced into 90 parts of methanol. This mixture was boiled with violent agitation for 15 minutes. After cooling down, the solution was filtered. It had about the same properties that were described in Example 3.

*Example 7*

(Mole proportion: chromium/stearic acid=2/1)

To 200 parts of isopropyl alcohol 29 parts of technical sodium stearate, 46.7 parts of technical chromic chloride, and 3.8 parts of pulverized technical sodium bichromate were added. This mixture was boiled with rapid agitation for 40 minutes. The green solution formed was treated in the same manner as described in Example 1 and had about the same properties.

*Example 8*

(Mole proportion: chromium/stearic acid=2/1)

To a solution of 286 kg. of technical stearic acid in 1500 kg. of isopropyl alcohol 484 kg. of technical crystallized chromic chloride and 94.4 kg. of technical sodium bichromate were added. The reaction mixture was heated to boiling with agitation and was kept under continued boiling for 20 minutes until a clear green solution was formed which contained 2 atoms of chromium per molecule of stearic acid. The solution was cooled down and filtered from the precipitate of sodium chloride. It was stable upon storage and after dilution with water it could be used for impregnating leather. Leather treated with the solution became soft and pliable after drying and highly hydrophobic. Upon prolonged immersion in water it absorbed only about one fifth of the amount of water absorbed by untreated leather and after being taken out of the water it dried within a few minutes' time while ordinary leather remains soggy for several hours.

*Example 9*

(Mole proportion: chromium/stearic acid about 1/1)

To a solution of 14.2 parts of stearic acid in 70 parts of isopropyl alcohol 13.5 parts of chromic chloride and 6.5 parts of magnesium bichromate were added. This reaction mixture was boiled with agitation for 10 minutes. After being filtered from the precipitate formed the solution had the same properties as that obtained in Example 3.

*Example 10*

To a solution of 28.4 parts of stearic acid in 120 parts of ethanol 27 parts of chromic chloride and 9.5 parts of sodium sulphite were added with agitation. This mixture was boiled for about 15 minutes. The complex chromic salt was formed in the solution with formation of sulphur dioxide.

*Example 11*

(Mole proportion: chromium/stearic acid=2/1)

To a solution of 56.8 parts of stearic acid in 300 parts of isopropyl alcohol 60 parts of pulverized sodium bichromate were added with agitation. Dry hydrogen chloride was bubbled into the agitated mixture at room temperature. The temperature rose because of the heat of reaction. Towards the end of the reaction external heating was applied. When nearly all of the bichromate was consumed and a sample of the mixture upon dilution with water showed the absence of free stearic acid, the operation was discontinued and the solution filtered off the sodium chloride formed. It had the same properties as the one obtained according to Example 1.

I claim:

1. Process for the production of Werner-type complex chromium compounds, which comprises contacting an organic acid, a neutral salt of trivalent chromium with a strong mineral acid, and a member selected from the group consisting of alkalis and salts of strong inorganic bases with weak acids, in the presence of an organic solvent, and thereby forming a complex chromium compound containing chromium an organic acid radical component and a mineral acid radical component in the proportion of 1–2 chromium atoms for each organic acid radical.

2. Process according to claim 1, in which said group member is a salt of a strong inorganic base with a weak acid, and in which said organic acid simultaneously comprises the weak acid in said salt of a strong inorganic base with a weak acid.

3. Process according to claim 1, in which chromic acid is said weak acid in said salt of a strong base with a weak acid.

4. Process according to claim 3, in which said organic solvent is an oxidizable alcohol and in which said salt of trivalent chromium with a strong mineral acid is at least partially formed in situ by reduction of the chromic acid radical to chrom-III ion with said alcohol.

5. Process for the production of Werner type complex chromium compounds, which comprises forming a salt of trivalent chromium with a strong mineral acid by reducing a bichromate to the trivalent state with isopropyl alcohol in the presence of dry HCl and reacting the salt of trivalent chromium formed with an organic acid in the presence of an organic solvent and thereby forming a complex chromium compound containing chromium, an organic acid radical component and a mineral acid radical component in the proportion of 1–2 chromium atoms for each organic acid radical.

6. Process for the production of Werner type complex chromium compounds, which comprises forming a salt of trivalent chromium with a strong mineral acid by reducing a bichromate to the trivalent state with a secondary alcohol in the presence of dry HCl and reacting the salt of trivalent chromium formed with an organic acid in the presence of an organic solvent and thereby forming a complex chromium compound containing chromium, an organic acid radical component and a mineral acid radical component in the proportion of 1–2 chromium atoms for each organic acid radical.

References Cited in the file of this patent

UNITED STATES PATENTS

| | | |
|---|---|---|
| 2,273,040 | Iler | Feb. 17, 1942 |
| 2,524,803 | Iler | Oct. 10, 1950 |
| 2,544,668 | Goebel et al. | Mar. 13, 1951 |
| 2,683,156 | Iler | July 6, 1954 |

FOREIGN PATENTS

| | | |
|---|---|---|
| 641,435 | Great Britain | Aug. 9, 1950 |